April 18, 1944. E. M. GREEN 2,346,835
SCREW FASTENER
Filed March 12, 1943
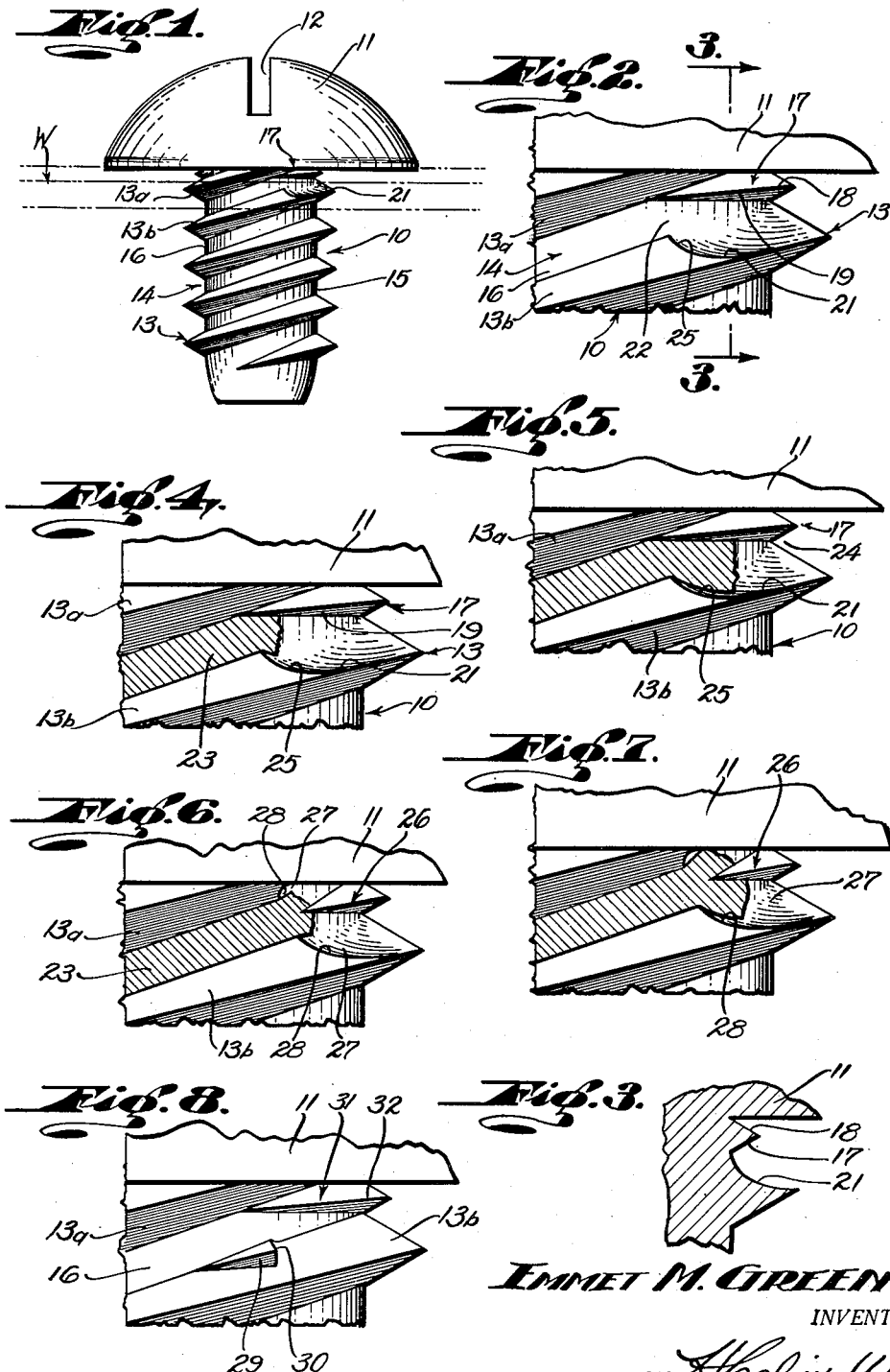
Emmet M. Green
INVENTOR.
BY H. Calvin White
Attorney.

Patented Apr. 18, 1944

2,346,835

UNITED STATES PATENT OFFICE 2,346,835

SCREW FASTENER

Emmet M. Green, Los Angeles, Calif.

Application March 12, 1943, Serial No. 478,872

14 Claims. (Cl. 85—46)

This invention has to do generally with improvements in screw-type fasteners, and is concerned particularly with screw fasteners having self-locking characteristics by virtue of their association and engagement with the work itself.

One of my primary objects is to provide a novel fastener which may have the same form and utility as screw fasteners in general, but which has the added advantage of being self-locking in the work, at least to the extent of effectively resisting loosening under normal or even extreme conditions short of deliberate forced loosening of the fastener itself. More specifically, my purpose is to provide a screw fastener which, in being turned into the work, acts upon the work material in a manner such that the final interengagement between the fastener and the work precludes reverse turning of the fastener except by deliberate forced reversal. In the latter event, the fastener can be loosened or removed, and it can again be turned into the same or different work, in a self-locking manner as indicated.

Although the invention may take various specific forms, it is generally preferred to embody the self-locking feature in screw fasteners which otherwise are of usual or standard form and dimensions, and in a manner permitting incorporation of the locking feature by simple manufacturing expedients and with minimum interference with the standard methods of forming the screw proper. At this point it may be observed that the invention is applicable to fasteners for various types and kinds of work, inclusive, for example, of metals in general, and nonmetallic materials such as wood, plastic and other compositions.

The locking effect of the invention results from the action of the fastener as it is turned into the work, to displace the work material from its normal condition or position between the stem threads, behind a shoulder formed on the stem as by a stem-contained recess, so that thereafter the displaced material presents a barrier against reverse turning of the fastener. In its preferred form, the work material displacing means comprises a projection within the groove between threads, and having a surface extending in such angular relation to the threads as to deflect the work material from its normal condition of parallelism with the threads, as the projection enters the work. Such displacement of the work material is permitted by providing a recess in the stem or thread and positioned opposite the projection to accommodate the material displaced. As will appear, the projection may be shaped as a tapered wedge facilitating both its penetration and displacement of the work material. Once displaced into the stem recess, the work material holds the fastener against retraction unless sufficient turning force is exerted to cause the stem to displace the work material from the recess back into the thread groove. As will be apparent, by selective dimensioning of the fastener parts with relation to the characteristics of the work, the fastener may be held in tightened or locked condition with varying degrees of security.

The above mentioned and other features and objects of the invention, as well as various details, will be more fully explained in the following description throughout which reference is had to the accompanying drawing, in which:

Fig. 1 is an elevation showing a typical embodiment of the invention in the form of a self-tapping screw;

Fig. 2 is an enlarged developed view illustrating the positions and relationships of the wedge element and the thread recess;

Fig. 3 is a fragmentary cross-section on line 3—3 of Fig. 2;

Figs. 4 and 5 are views similar to Fig. 2 illustrating the work material displacement by the wedge element and the resulting condition of the work material within the thread recess;

Figs. 6 and 7 are views similar to Figs. 4 and 5 showing a variational form of the invention; and Fig. 8 is a view similar to Fig. 2 illustrating another variational form of the invention.

Referring to Fig. 1, the fastener comprises a threaded stem 10 and an integral head 11 containing the driver slot 12. It will be understood of course that the invention is independent of the particular shape of the head 11, and therefore that the illustrated form is to be regarded merely as typical. The specific type and form of the stem thread also is subject to variation with the broad contemplation of the invention, although it is preferred to use a self-tapping thread, i. e. one which after insertion in a preformed opening in the work corresponding in diameter substantially to the base diameter of the thread, can be turned into the unthreaded work. Accordingly, the stem is shown to include substantially V-shaped, self-tapping threads 13, the turns of which are spaced to form grooves 14 having as their bases the substantially straight or cylindric stem surfaces 15. For purposes of illustration, I have shown a double thread screw, with the understanding that the invention is equally applicable to single thread screws. It may be further observed at this point that the combination wedge element and shoulder or recess, now to be described, may be used singly regardless of the number of threads, or in numbers corresponding to the number of individual threads.

In the developed views of Figs. 2 and 4 to 7, the opposed sides of adjacent threads are indicated at 13a and 13b, and the intervening base of the groove 14 at 16. The wedge element, generally indicated at 17, preferably is located adjacent or closely toward the head of the stem to assure the effectiveness of the wedge element and recess combination regardless of the thickness of the work (illustrated typically by the dotted lines at W as metal sheets), and particularly where that thickness may be of relatively small dimension. In the form of the invention shown in Figs. 2 to 5, the wedge element 17 comprises a projection extending radially from the base 16 of the groove, and longitudinally between the thread surfaces 13a and 13b.

As shown in Fig. 3, the maximum radial extent of the projections 17 is considerably less than that of the threads 13, the exact relationship in any particular instance being variable in accordance with such considerations as the nature of the work material and its displacement required to retain the fastener with the desired security in set or tightened condition. In general, however, the radial extent of the projection 17 will be small as compared with that of the threads. The projection 17 is tapered radially to an edge 18, also transversely and along the edge 18 to its lower end. The forward face 19 of the wedge may extend from the thread surface 13a within groove 14, or from any suitable point approaching the thread, at angular variance with the course of the threads and toward the opposite recessed thread. The thread face 19 presents, as illustrated, a wedge surface capable of displacing the work material toward the recess as the wedge is turned into the work.

Work material displaced by the wedge element is received within a recess 21 formed in the thread surface 13b opposite the wedge element. The recess 21 is of sufficient size to accommodate the displaced work material and preferably is positioned with relation to the wedge element, and given ample spacing therefrom at 22, to permit free movement of the displaced material into the recess.

As the fastener is turned into the work, the element 17 in due course of stem rotation is caused to enter the work material 23 as shown in Fig. 4. Continued advancement causes the wedge surface 19 to deflect or displace the work material from its normal condition between the threads, into the recess 21 as shown in Fig. 5. As will be understood, the wedge element ultimately may reach a position of advancement into the work to a greater or lesser degree than that appearing in Fig. 5. Where the wedge enters further into the work, the material 23 finds access to the space at 24 between the wedge and the trailing portion of the recess.

After the wedge has entered and displaced the work material, the fastener is held securely against accidental or vibrational release through reverse rotation, by the engagement of shoulder 25 with the work material displaced into the recess. Depending upon the proportions of the wedge element, the quantity or degree of work material deflection, and the dimensions of the recess 21, the fastener may be made to resist reverse turning to varying degrees. The fastener however may be turned out of the work by asserting a reverse turning force sufficiently great to cause shoulder 25 to displace the deflected work material back into normal position within the groove 16. After loosening or withdrawal from the work, the fastener may again be turned into releasably locked condition within the work as described. Depending upon its particular shape, the shoulder 25 may be caused to displace the work material back into the groove upon reverse turning of the fastener, or to shear the material back of the shoulder.

The form of the invention illustrated in Figs. 6 and 7 is similar to the described embodiment, except that in this instance the wedge element 26 is positioned more centrally within the groove between recesses 27 in the threads at both sides of the element. As it enters the work, see Fig. 6, the wedge element divides the work material 23, displacing it into both recesses 27, thus forming a double-shouldered abutment engaged by the recess ends 28 to resist backing out of the screw. The mode of operation and its effects otherwise are essentially the same as in the form illustrated in Figs. 4 and 5.

In the described forms of the invention the shoulders 25 and 28 engageable with the displaced work to resist backing out of the screw, are formed by recesses in the stem threads. Fig. 8 illustrates a further variational embodiment of the invention in which the work engaging shoulders is formed by a raised projection or upset on the stem. Specifically the shoulder forming element may take the form of a small tapered upset 29 positioned within the bottom portion of the groove at the intersection of the thread surface 13b and the base 16 of the groove, substantially as illustrated. The upset 29 forms a raised recess and shoulder 30 positioned with relation to the wedge element 31 (corresponding to the previously described wedge element 17 in Fig. 2) such that as the upset and wedge element are turned into the work, the work material is displaced by the wedge surface 32 into the recess back of the shoulder 30. Thereafter, reverse turning of the screw is resisted by engagement of shoulder 30 with the displaced work material, all in the manner previously explained.

The invention is not to be regarded as limited to the particular details shown, since various modifications may be made in such features as the shapes, forms and positions of the wedge element and recess combination without departure from the intended scope of the invention.

I claim:

1. A fastener comprising a stem carrying a thread adapted to be turned into the work with the groove between the stem threads entering and receiving the work material, a head on said stem, a projection carried by the stem between the threads and adjacent said head for displacing the work material from its normal position between the threads as the stem advancement approaches a position of engagement of the head against the work, and means forming on the stem a shoulder behind which the work material is so displaced and which is engageable with the displaced work material to resist retractive turning of the stem.

2. A fastener comprising a stem carrying a self-threading V-thread adapted to be turned into the work with the groove between the stem threads entering and receiving the work material, a head on said stem, a projection carried by the stem between the threads and adjacent said head for displacing the work material from its normal position between the threads as the stem advancement approaches a position of engagement of the head against the work, and means forming on the stem a shoulder behind which the work material is so displaced and which is engageable with the displaced work material to resist retractive turning of the stem.

3. A fastener comprising a stem carrying a thread adapted to be turned into the work with the groove between the stem threads entering and receiving the work material, a head on said stem, a projection on said stem formed integrally with said head and extending therefrom within the thread groove, said projection acting to displace the work material from its normal position between the threads as the stem advancement approaches a position of engagement of the head against the work, and means forming on the stem a shoulder behind which the work material is so displaced and which is engageable with the displaced work material to resist retractive turning of the stem.

4. A fastener comprising a stem carrying a thread adapted to be turned into the work with the groove between the stem threads entering and receiving the work material, a head on said stem, a projection carried by the stem between the threads and adjacent said head for displacing the work material from its normal position between the threads as the stem advancement approaches a position of engagement of the head against the work, and means forming in the thread entirely at one side of the crest thereof a recess into which the work material is so displaced to resist retractive turning of the stem.

5. A fastener comprising a stem carrying a self-threading V-thread adapted to be turned into the work with the groove between the stem threads entering and receiving the work material, a head on said stem, a wedge-shaped projection carried by the stem between the threads and adjacent said head for displacing the work material from its normal position between the threads as the stem advancement approaches a position of engagement of the head against the work, and means forming in the thread entirely at one side of the crest thereof a recess into which the work material is so displaced to resist retractive turning of the stem.

6. A fastener comprising a stem carrying a thread adapted to be turned into the work with the groove between the stem threads entering and receiving the work material, a head on said stem, a projection on said stem formed integrally with said head and extending therefrom within the thread groove, said projection acting to displace the work material from its normal position between the threads as the stem advancement approaches a position of engagement of the head against the work, and means forming in the thread entirely at one side of the crest thereof a recess into which the work material is so displaced to resist retractive turning of the stem.

7. A fastener comprising a stem carrying a thread adapted to be turned into the work with the groove between the stem threads entering and receiving the work material, a head on said stem, a wedge-shaped projection on said stem formed integrally with said head and extending therefrom within the thread groove, one side of said projection extending to the base of the groove and the opposite side of the projection intersecting the under-surface of the head, said projection acting to displace the work material from its normal position between the threads as the stem advancement approaches a position of engagement of the head against the work, and means forming on the stem a shoulder behind which the work material is so displaced to resist retractive turning of the stem.

8. A fastener comprising a stem carrying a self-threading V-thread the turns of which are spaced apart to form widened base grooves between the threads, a head on said stem, a projection on the base surface of the thread groove adapted to displace the work material from its normal position between the threads, and means forming on the stem a shoulder offset longitudinally of the thread with relation to said projection and behind which the work material is so displaced to resist retractive turning of the stem.

9. A fastener comprising a stem carrying a self-threading V-thread the turns of which are spaced apart to form widened base grooves between the threads, a head on said stem, a projection on the base surface of the thread groove adapted to displace the work material from its normal position between the threads, the width of said projection being substantially less than the distance between the crests of adjacent threads, and means forming on the stem a shoulder offset longitudinally of the thread with relation to said projection and behind which the work material is so displaced to resist retractive turning of the stem.

10. A fastener comprising a stem carrying a self-threading V-thread the turns of which are spaced apart to form widened base grooves between the threads, a head on said stem, a projection on the base surface of the thread groove directly adjacent the under-surface of said head and adapted to displace the work material from its normal position between the threads, and means forming on the stem a shoulder offset longitudinally of the thread with relation to said projection and behind which the work material is so displaced to resist retractive turning of the stem.

11. A fastener comprising a stem carrying a self-threading V-thread the turns of which are spaced apart to form widened base grooves between the threads, a head on said stem, a wedge-shaped projection formed integrally with said head and extending therefrom on the base surface of the thread groove, said projection being adapted to displace the work material from its normal position between the threads as the stem advancement approaches a position of engagement of the head against the work, and means forming in the thread entirely at one side of the crest thereof a recess into which the work material is so displaced to resist retractive turning of the stem.

12. A fastener comprising a stem carrying a thread adapted to be turned into the work with the groove between the stem threads entering and receiving the work material, a head on said stem, a projection carried by the stem and extending radially therefrom between the threads adjacent said head a distance substantially less than the maximum thread diameter, said projection being adapted to displace the work material from its normal position between the threads as the stem advancement approaches a position of engagement of the head against the work, and means forming on the stem a shoulder projecting outwardly from the side surface of the thread and behind which the work material is displaced to resist retractive turning of the stem.

13. A fastener comprising a stem carrying a self-threading V-thread the turns of which are spaced apart to form widened base grooves between the threads, a head on said stem, a projection on the base surface of the thread groove adapted to displace the work material from its normal position between the threads, and means forming a shoulder projecting outwardly from the surface of the stem and behind which the work material is so displaced to resist retractive turning of the stem.

14. A fastener comprising a stem carrying a self-threading V-thread the turns of which are spaced apart to form widened base grooves between the threads, a head on said stem, a wedge-shaped projection formed integrally with said head and extending therefrom on the base surface of the thread groove, said projection being adapted to displace the work material from its normal position between the threads as the stem advancement approaches a position of engagement of the head against the work, and means forming a shoulder projecting outwardly from a side surface of the thread near and in offset relation to said projection, the work material being displaced by said projection behind said shoulder to resist retractive turning of the stem.

EMMET M. GREEN.